COMBINATION MOTION PICTURE AND TELEVISION CAMERA

Filed Nov. 26, 1956 4 Sheets-Sheet 1

INVENTORS.
Warren R. Smith &
Robert R. Ferber.
BY
William J. Ruano
THEIR ATTORNEY.

COMBINATION MOTION PICTURE AND TELEVISION CAMERA

INVENTORS.
Warren R. Smith &
Robert R. Ferber.
BY
William J. Ruano
THEIR ATTORNEY.

Nov. 15, 1960 W. R. SMITH ET AL 2,960,565

COMBINATION MOTION PICTURE AND TELEVISION CAMERA

Filed Nov. 26, 1956 4 Sheets-Sheet 3

INVENTORS.
Warren R. Smith &
Robert R. Ferber.
BY: William J. Ruano
THEIR ATTORNEY.

COMBINATION MOTION PICTURE AND TELEVISION CAMERA

Filed Nov. 26, 1956 4 Sheets-Sheet 4

INVENTORS.
Warren R. Smith &
Robert R. Ferber.
BY
William J. Ruano
THEIR ATTORNEY.

United States Patent Office 2,960,565
Patented Nov. 15, 1960

2,960,565

COMBINATION MOTION PICTURE AND TELEVISION CAMERA

Warren R. Smith and Robert R. Ferber, Pittsburgh, Pa., assignors to Tele-Cam Inc., Pittsburgh, Pa.

Filed Nov. 26, 1956, Ser. No. 624,389

1 Claim. (Cl. 178—6)

The present invention relates to a combination motion picture camera and television camera provided with a unique lens system. This combination is intended primarly to replace kinescope recording as a means of securing film reproductions of a television program. The combination is also especially suitable for shooting short or even long film spots in which instance the television camera can serve as a continuous, electronic view finder and thus provide many outstanding advantages.

Kinescope recordings are presently employed as the conventional means for securing film reproductions of a television program for later broadcast at various other television stations. However, kinescope recordings have many outstanding disadvantages, such as a very large loss of resolution and definition due to limitations of television equipment, also a large loss of contrast ratio as well as objectionable line structures and snow which appear on the television picture and, in addition, shutter bars and flicker from the kinescope recording camera. All of these result in a very inferior picture as compared to that obtainable in a "live" television show. Moreover, in view of the principle of operation of the image orthicon in the television camera, there is an inherent persistency or "burning in" of the image which continues to appear even after the scene has changed, thereby giving the appearance of a double exposure and greatly interfering with the quality of the picture.

A still further disadvantage of kinescope recordings is that all mistakes that occur during a live program are recorded permanently on film.

Another outstanding disadvantage of kinescope recording is that it is useful for reproducing only black and white film and is unsuitable for reproducing color film.

An object of the present invention is to provide a novel camera combination or system which is useful as a substitute for kinescope recording and which is devoid of all the above mentioned disadvantages of kinescope recording.

A still further and more specific object of the present invention is to provide an adapter incorporating a novel lens system upon which a television station's existing television camera can be easily and quickly mounted and used with the station's tripod or dolly, so as to avoid the necessity of purchasing a special television movie film combination camera, and thus duplicating equipment, that is, the television camera portion (a very expensive unit).

A more specific object of the present invention is to provide a novel combination of motion picture film camera and television camera by providing a novel common lens system arranged in a manner so that there is no loss of resolution, and, instead, the resolution is the maximum obtainable on the film camera, such as a standard 16 mm. film camera, which requires a well designed optical system providing excellent resolution.

A further object of the invention is to provide a novel mechanical-optical unit which unites a standard television camera and a standard 16 mm. motion picture camera by a common lens system uniquely arranged so as to provide no loss of contrast ratio and which will reproduce television programs on film so as to be devoid of objectional line structures, shutter bar, snow and other imperfections inherent in the use of video transfer equipment, and wherein the quality of the resultant film is the same as that provided by a standard 16 mm. movie camera.

Another object of the invention is to provide a movie film-television camera combination which is highly useful, not only for obtaining television reproductions on black and white film, but which is also useful for obtaining such reproductions on color film.

A still further object of the invention is to provide a motion picture camera and television camera combined in a manner so as to provide an excellent unit particularly adapted for "shooting" short or medium film productions, during which the television picture is not broadcast and the television camera is used as a precise and continuous view finder enabling the director to see, at all times, by looking at the control room monitor, the exact picture each cameraman has, thereby facilitating his instructions concerning the exact shots he wants and thus eliminating the guess work attendant conventional methods of filming by a 16 mm. camera, during which filming the director cannot see the picture that is being filmed. Also, it enables the director to view the complete show and to pick out any mistakes or revisions before the film is cut, thus saving considerable expense.

And a still further advantage and object of the present invention is to provide a mechanical-optical unit combining a motion picture and television camera by a unique, common lens system which will greatly facilitate keeping the film camera in focus because of the resultant increase of focus and which enables the cameraman to more easily focus lenses as they are changed and to follow the object at all times since the object is in direct line of sight forwardly of the television camera, instead of being laterally offset as in other movie film-television camera combinations.

A still further object of the present invention is to provide a television and movie film camera combination which may be used either to replace kinescope recordings for reproducing television programs and which may be used to broadcast a "live" quality program instead of the familiar poor quality kinescope recording, and which permits addition of film footage inserted in the final film, such as titles, animation or special demonstration footage, without making the rest of the film look inferior.

Other objects and advantages of our invention will become more apparent from a study of the following description taken with the accompanying drawings wherein.

Figure 1:
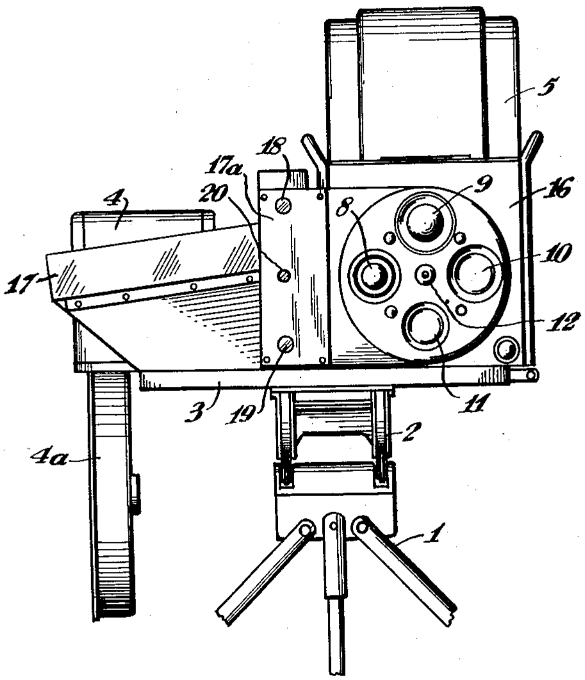
Figure 1 is a front, elevational view of a mechanical-optical unit combining a television camera and a motion picture camera in accordance with the principles of the present invention.
Figure 2:
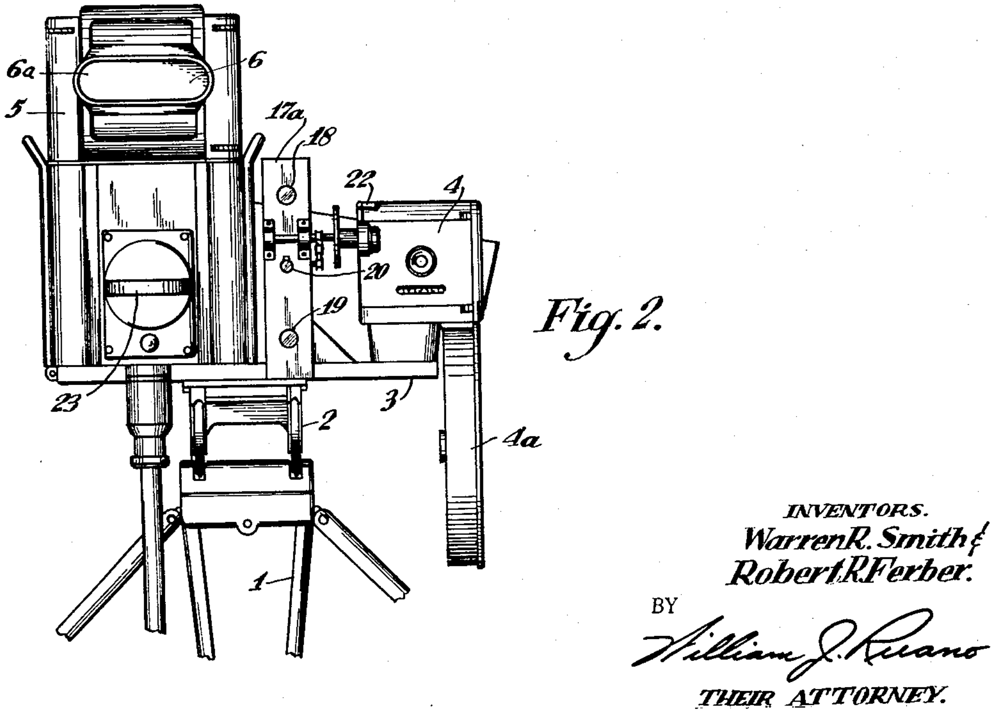
Figure 2 is a rear view of the camera combination shown in Figure 1.
Figure 3:
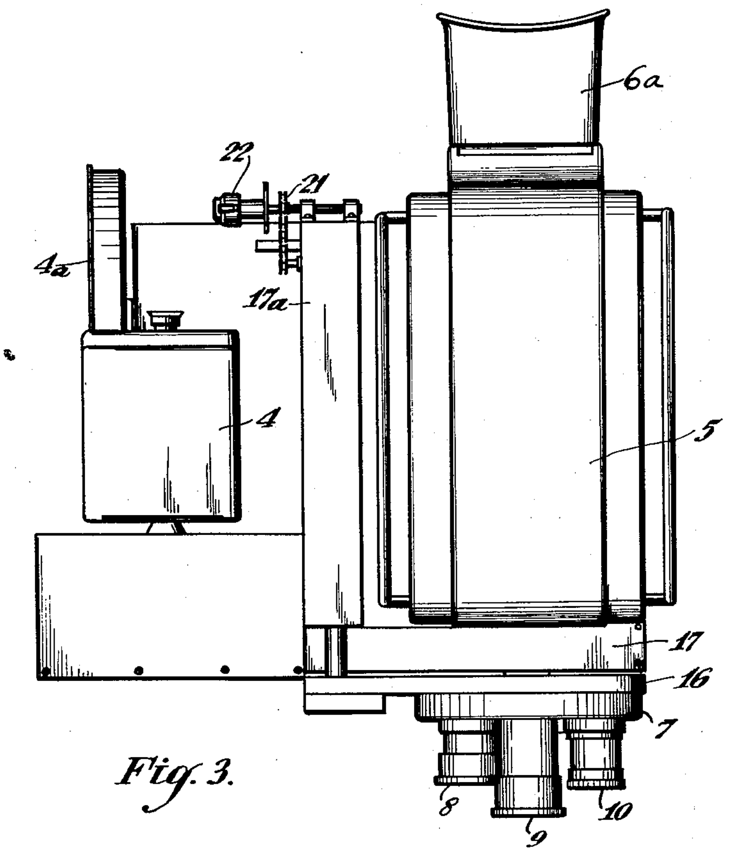
Figure 3 is a top view of the apparatus shown in Figures 1 and 2.

Referring more particularly to Figures 1 to 3 of the drawings, numeral 1 denotes a television camera tripod or dolly of any well known construction having an adjustable pivot 2. On the top of dolly 1 there is detachably mounted a base plate 3 of aluminum or other suitable material for supporting a motion picture camera 4 and a television camera 5. The motion picture camera 4 may be a standard 16 mm. "Auricon 1200" (sold by Berndt Bach Inc., Hollywood, California) mounted upside down to obtain a correct picture, that is, correct top to bottom as well as left to right since the optical system inverts the image of the object viewed. The motion picture camera 4, which is mounted on one side of the television camera, has a film containing housing *4a* which encloses either black and white film or color film.

Television camera 5 may be of any well known construction, such as a standard RCA television camera (TK11 or TK15) sold by the Radio Corporation of America of Camden, New Jersey. The television camera 5 is provided with a view finder 6 enclosed by an eye shield *6a* for shielding the eyes of the cameraman against outside light while looking through the view finder.

Figure 4:
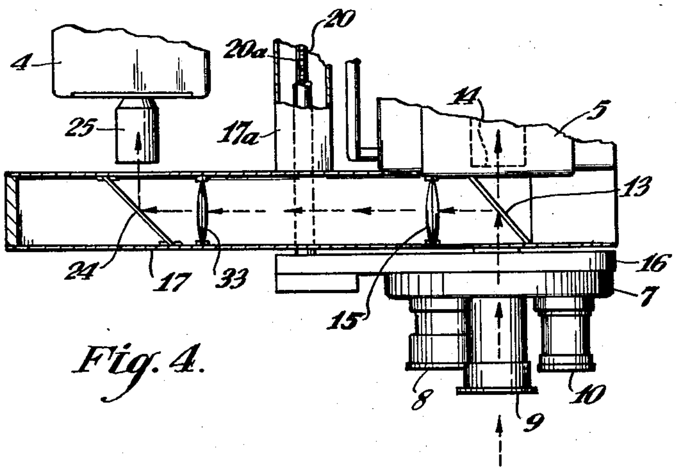
Figure 4 is a top fragmentary view, partly in cross-section of the apparatus shown in Figures 1 to 3 and more clearly illustrating the common optical system for the film camera and television camera.

Forwardly of the television camera is mounted a lens turret 7 which includes a plurality of lenses 8, 9, 10, and 11, arranged along a circular path about shaft 12 as a center and having different focal distances. A handle 23, mounted on the rear of the television camera, is rigidly secured to shaft 12 which, in turn, is coupled to turret by a sliding coupling. Thus, turning of handle 23 will rotate turret 7 and permit selection of any of the lenses 8, 9, 10 or 11 for alignment with pellicle 13 shown in Figure 4. Therefore, close-up or distant pictures may be selectively taken.

In a conventional television camera, turret 7 is mounted immediately in front of the camera. Therefore, in order to sandwich an optical system, embodying the present invention, between a standard television camera and conventional turret 7, the following operations are required on the camera. The turret is removed from the television camera. Then, the image orthicon 14 is pushed in its mounting to the most forward position and locked. The conventional focusing knob is removed. A black light shield with a hole in it to permit the light beam from the selected lens to go through, but keep stray light out, is mounted on the front of the camera.

Figures 5, 6, 7, 8:
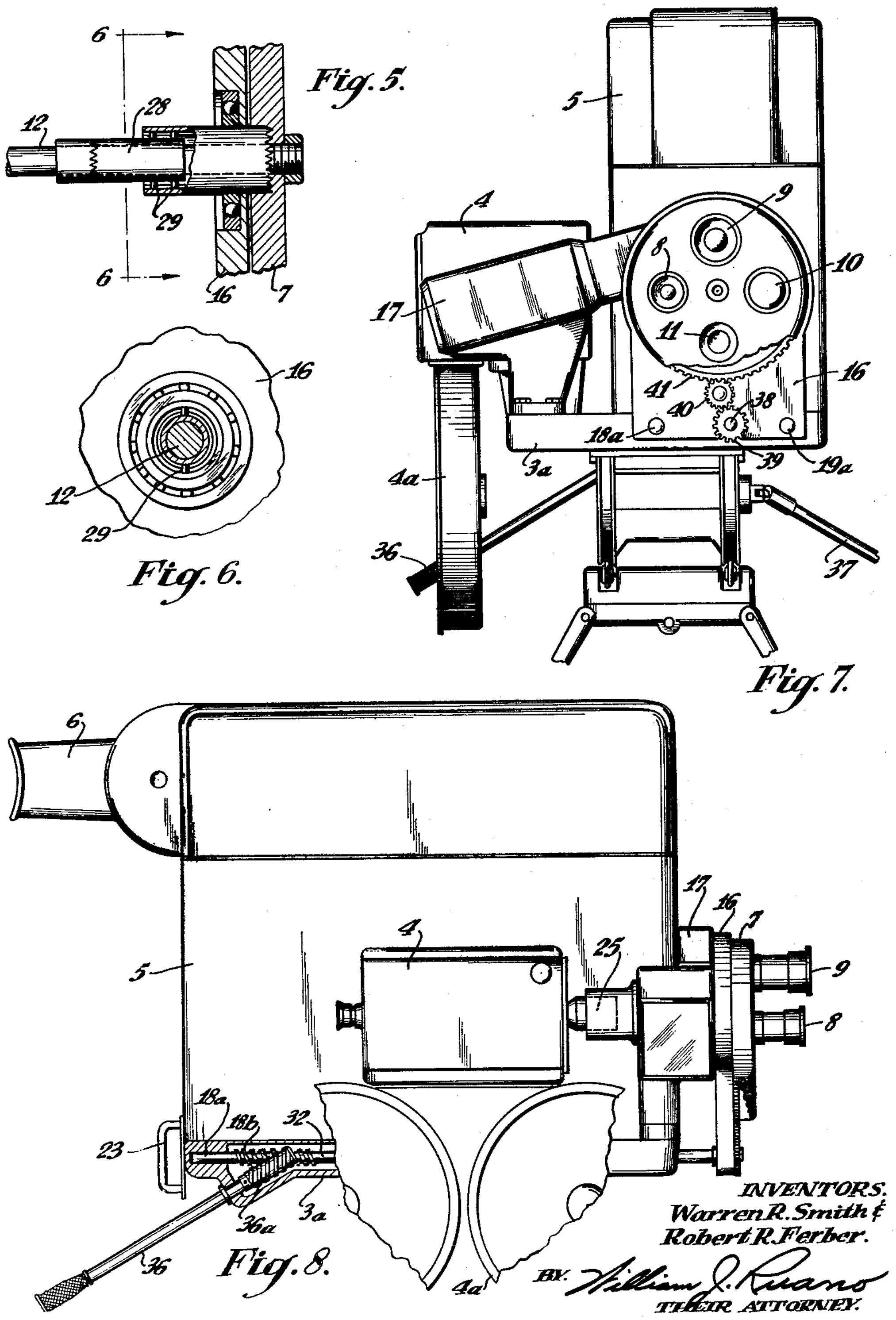
Figure 5 is an enlarged side view, partly in section of the turret connection.
Figure 6 is a section taken along line 6—6 of Figure 5.
Figures 7, 8 and 9 are front, side and top views, partly cut away, of a modification.

A turret mounting plate 16 is interposed between the turret 7, and the housing 17 which encloses the optical system. The turret is mounted so that it may be slidably moved toward and away from the front of the television camera and the optical housng 17. Such slidable mounting is obtained by placing a turret rotating cylinder 28 on the turret rotating shaft 12 in place of the turret. Such cylinder may have two pins 29 at 180 degrees apart that slide into corresponding longitudinal slots in the hub of the turret mounting shaft on the turret mounting plate 16 as shown in Figures 5 and 6.

Rigidly secured to the turret mounting plate 16 are the forward ends of horizontal, vertically spaced rods 18—19 which are slidably guided in the end plates of housing *17a* so as to enable the turret mounting plate to be pushed forwardly and rearwardly so as to obtain focus while still allowing the turret to be rotated to selectively bring any desired lens on the turret into use.

The forward ends of rods 18 and 19, and of a central parallel rod 20, are connected together as a unit with plate 16 which is adapted to slide forwardly and rearwardly from the front end of housing *17a*. This is accomplished by milling gear teeth *20a* in rod 20 and by providing a driving pinion in housing *17a* (not shown) which engages these teeth, and which pinion is driven by a chain and sprocket drive 21 which, in turn, is driven by turning a conventional focussing knob on handle 22 at the right of the television cameraman. Thus by cranking handle 22 in one direction, the turret is moved forwardly of the camera, and by turning it in an opposite direction, the turret is moved toward the camera, so as to focus the selected lens mounted on the turret.

In accordance with the present invention, a novel and unique optical system is provided which is common to both the television camera 5 and film camera 4. The optical system is shown more clearly in Figure 4 and is enclosed in a separate housing or attachment 17 and is mounted forwardly of both cameras.

The optical system is so constructed that the television camera gets a direct image while the light reaching the film camera goes through a complex optical system. The optical system and beam splitter permit an image of object O to be formed on the image orthicon 14 of the television camera while diverting a percentage of the available light through a lens system to the 16 mm. camera located beside the television camera. To accomplish this, the objective lens on the turret forms an image as usual. The light beam strikes a pellicle 13 mounted at a 45 degree angle approximately half way between the last lens element and the focal point. The television portion of the image goes through the partially reflecting pellicle. This transmitted light is about 15% of the total light. The pellicle reflects another image at right angles to the lens axis which is about 50% of the total light. This beam is the one used for the film. It is first focused at the center of a 1¾" field lens 15 at an axial distance equal to that between the objective lens and the image orthicon of the television camera. The light transmitted by the field lens goes through a culminating lens 33 which brings the rays out parallel to each other. They are reflected from a 45 degree front surface mirror 24 which directs them in the same direction as the original beam but to the side of the television camera by several inches. Here the light beam goes through the 16 mm. camera relay lens 25 where the rays are focused upon the film.

The film camera uses a 100 mm. F 2 lens which effectively sees an object at infinity. One of the outstanding advantages of the present optical system over other television-film camera combinations is that the film camera has a depth of focus which is four times the depth of focus of the television camera. This makes focusing for the film camera very simple—anytime the television picture is reasonably near focus, the film image is in good focus. The reduction of image size increases the light intensity of the 16 mm. frame which makes it possible to shoot films of lower speed ratings without increasing the amount of light. With 1000 ft. candles of illumination, type A Kodachrome can be used with the lenses on the turret at F 4.0. Focusing is accomplished by moving the entire turret on a slide assembly which is completely rigid. The housing 17 and the enclosed optical system remains stationary. Using this system the film camera focus follows the television camera focus at all times with any of the lenses 8 to 11 in use.

After the turret 7 is placed upon the rotating shaft on the turret mounting plate 16, the objective lenses are screwed on. These lenses have special mounts which permit them to be focused at this extended turret separation from the television camera. Every lense under 100 mm. is a specially designed lens with a long back focal length.

The focus knob 22 is turned until the image is sharp in the television viewfinder 6, then the film camera image is focused with the relay lens focus ring. From then on, the film camera is in sharp focus when the television camera shows proper focus in the viewfinder.

Final adjustment to insure the film camera seeing what is seen in the viewfinder is made by adjusting the television sweeps to match the film image.

The cameraman is enabled to easily follow focus on dolly and pan shots and to focus each lens immediately after being flipped into position by rotation of the turret. This is not possible with standard film cameras and shooting techniques. In continuous shooting of long shows, a kinescope is made of the switcher output (the composite show complete with cuts and dissolves) to serve as an editing master. This also enables the director to view the complete show and pick out any mistakes or possible revisions before the original film is cut.

Figure 9:
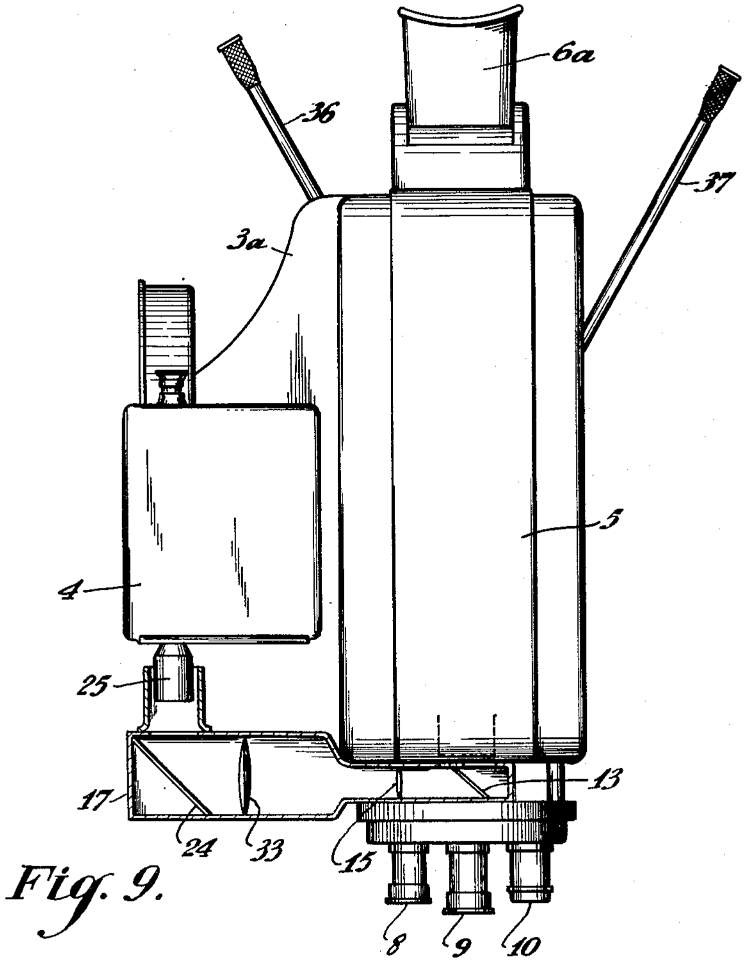

Figures 7, 8 and 9 show a modification of the device shown in Figures 1 to 6 wherein a modified form of turret guiding means is provided to enable the film camera 4 and television camera 5 to be brought more closely together. Broadly stated, the turret guiding means instead of being interposed between the cameras is embodied in the base. The cameras and the optical system are the same as described above and parts thereof are denoted by the same reference numerals.

More specifically, the turret mounting plate 16 is rigidly secured to the forward ends of two rods 18*a* and 19*a* which are slidably mounted in base 3*a* to permit forward and rearward movement of the turret mounting plate 16. Such movement may be effected by providing helical teeth 18*b* on rod 18*a* which are in meshing relationship with a worm 36*a* on handle 36, whereby the turning of handle 36 in opposite directions will result in forward and rearward movements of shafts 18*a* and 19*a* and focussing of the respective lenses 8, 9, 10 and 11. Handle 23 is secured to a separate shaft 38 and rotation thereof effects rotation of the turret 7 and selection of the desired lens. More specifically, rotation of shaft 38 turns spur gear 39 rigidly connected thereto which rotates a pinion 40 which, in turn, drives a ring gear 41 formed on the turret 7. Thus the turret is driven in the same direction as handle 23. It is desirable to provide a gear ratio such that as the handle 23 is rotated one turn the turret will also rotate one turn.

Thus, a very compact arrangement is provided in that the two cameras may be mounted in close side-by-side relationship.

The optical unit or adapter can be installed and aligned in less than 15 minutes or removed in less than 10 minutes when necessary. The combination film-television camera unit is operated in exactly the same way as a standard television camera would be, therefore the cameraman needs no special training. More specifically, the focusing crank 22 is in the same position as the standard television focussing crank and the lenses are changed by rotation of the same turret rotating handle 23 that changes them normally. The only difference is the increase in weight of the unit which helps the cameraman make smoother pans and dollies.

Thus it will be seen that we have provided an efficient mechanical-optical unit or adapter which unites a standard television camera and a standard motion picture camera by a common lens system, which unit may be easily and quickly installed on the television camera. The resulting television-film camera combination and common lens system may then be used for reproducing television shows on either black and white or on color film, which has been heretofore impossible by using conventional kinescope recording systems; furthermore we have provided a combination wherein the television camera will broadcast the show "live" while being filmed, or wherein the show is not broadcast and the television camera is used as a viewfinder to enable the director to continuously watch the shots while they are being taken so as to eliminate erroneous or undesirable shots; also we have provided a television-film camera combination that produces film infinitely better than that produced by kinescope recording and which is the same in quality as that obtained on "live" television shows, that is, devoid of flicker, shutter bars, snow, poor definition and depth of focus, etc.; furthermore we have provided a unit which eliminates the necessity and expense of purchasing a special film-television camera combination and setting aside of the television camera, therefore which reduces considerably the expense of maintaining a television station and film studio.

While we have illustrated and described a single specific embodiment of our invention, it will be understood that this is by way of illustration only, and that various changes and modifications may be made within the contemplation of our invention and within the scope of the following claim.

We claim:

In combination with a television camera having a stationary image orthicon, and a motion picture camera alongside said camera, a separate, light-tight box containing an optical system common to both cameras, said box disposed transversely across the front of the cameras and including a pellicle forwardly of and at an angle of 45° with respect to said image orthicon for transmitting only a portion of the light from an object and for reflecting a portion thereof along an optical path transversely of the front of both cameras, said box also including a field lens and a culminating lens in said optical path for providing a parallel beam of light, also a mirror which is arranged at an angle of 45° forwardly of said motion picture camera to direct said beam into the motion picture camera, a turret rotatably mounted forwardly of said box and pellicle and including a plurality of circularly arranged lenses of different focal length which are selectively aligned with said pellicle by rotation of the turret, and focussing means for adjustably sliding the turret away from and towards said pellicle, whereby images of an object will appear simultaneously in both cameras, said focussing means including a base plate on which said turret is rigidly mounted, a plurality of rods associated with said television camera and slidable in a direction parallel to the axes of said turret lenses, the forward ends of said rods being rigidly secured to said base plate, and control means for sliding said rods, base plate and turret lenses toward and away from said pellicle.

References Cited in the file of this patent

UNITED STATES PATENTS

| | | |
|---|---|---|
| 2,162,908 | Bedford | June 20, 1939 |
| 2,426,184 | Deloraine | Aug. 26, 1947 |
| 2,615,088 | Gordon | Oct. 21, 1952 |
| 2,690,472 | Boucheron | Sept. 28, 1954 |
| 2,698,356 | Roos | Dec. 28, 1954 |
| 2,709,391 | Reeves | May 31, 1955 |
| 2,821,105 | Walker | Jan. 28, 1958 |

FOREIGN PATENTS

| | | |
|---|---|---|
| 1,083,466 | France | Jan. 10, 1955 |